(12) United States Patent
Clawson, Jr. et al.

(10) Patent No.: US 11,779,016 B2
(45) Date of Patent: *Oct. 10, 2023

(54) SOLUTIONS FOR ENHANCING THE EFFECTIVENESS OF INSECTICIDES AND FUNGICIDES ON LIVING PLANTS AND RELATED METHODS

(71) Applicant: KOP-COAT, INC., Pittsburgh, PA (US)

(72) Inventors: Ronald W. Clawson, Jr., Trafford, PA (US); Hans A. Ward, Wexford, PA (US); Kenneth A. Cutler, Verona, PA (US); Cameron R. Scott, Rotorua (NZ)

(73) Assignee: KOP-COAT, INC., Pittsburgh, PA (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/311,204

(22) PCT Filed: Jun. 19, 2019

(86) PCT No.: PCT/UD2019/037851
§ 371 (c)(1),
(2) Date: Jun. 4, 2021

(87) PCT Pub. No.: WO2020/117315
PCT Pub. Date: Jun. 11, 2020

(65) Prior Publication Data
US 2022/0000104 A1    Jan. 6, 2022

Related U.S. Application Data

(63) Continuation of application No. 16/208,976, filed on Dec. 4, 2018, now Pat. No. 10,952,433, which is a continuation-in-part of application No. 14/674,465, filed on Mar. 31, 2015, now abandoned.

(51) Int. Cl.
| | | |
|---|---|---|
| A01N 33/24 | (2006.01) | |
| A01P 7/04 | (2006.01) | |
| A01N 43/653 | (2006.01) | |
| A01N 53/00 | (2006.01) | |
| A01N 43/78 | (2006.01) | |
| A01N 43/36 | (2006.01) | |
| A01N 43/50 | (2006.01) | |
| A01N 37/34 | (2006.01) | |
| A01N 55/02 | (2006.01) | |
| A01N 43/76 | (2006.01) | |
| A01N 37/46 | (2006.01) | |
| A01N 43/56 | (2006.01) | |
| A01N 55/00 | (2006.01) | |
| A01N 37/40 | (2006.01) | |
| A01N 43/22 | (2006.01) | |
| A01N 43/88 | (2006.01) | |
| A01P 3/00 | (2006.01) | |
| A01N 25/02 | (2006.01) | |

(52) U.S. Cl.
CPC .............. *A01N 33/24* (2013.01); *A01N 25/02* (2013.01); *A01N 37/34* (2013.01); *A01N 37/40* (2013.01); *A01N 37/46* (2013.01); *A01N 43/22* (2013.01); *A01N 43/36* (2013.01); *A01N 43/50* (2013.01); *A01N 43/56* (2013.01); *A01N 43/653* (2013.01); *A01N 43/76* (2013.01); *A01N 43/78* (2013.01); *A01N 43/88* (2013.01); *A01N 53/00* (2013.01); *A01N 55/00* (2013.01); *A01N 55/02* (2013.01); *A01P 3/00* (2021.08); *A01P 7/04* (2021.08)

(58) Field of Classification Search
CPC ....................................................... A01N 33/24
See application file for complete search history.

(56) References Cited

U.S. PATENT DOCUMENTS

| | | | |
|---|---|---|---|
| 6,165,483 A | 12/2000 | Hei et al. | |
| 6,375,727 B1 | 4/2002 | Walker | |
| 6,416,789 B1 | 7/2002 | Marks et al. | |
| 6,508,869 B2 | 1/2003 | Tseng et al. | |
| 6,527,981 B1 | 3/2003 | Tseng et al. | |
| 7,056,919 B2 | 6/2006 | Ross et al. | |
| 10,278,386 B2 * | 5/2019 | Ward ...................... | A01P 7/00 |
| 10,362,783 B2 * | 7/2019 | Ward ...................... | A01N 57/20 |
| 10,383,336 B2 * | 8/2019 | Ward ...................... | A01N 43/40 |
| 10,952,433 B2 * | 3/2021 | Clawson, Jr. .......... | A01N 37/18 |

(Continued)

FOREIGN PATENT DOCUMENTS

| | | |
|---|---|---|
| EP | 1273234 A1 | 1/2003 |
| EP | 1366662 A1 | 12/2003 |

(Continued)

OTHER PUBLICATIONS

Extended European Search Report in EP3895536, dated Sep. 22, 2021.
Xue et al., A Residue-Free Freen Synergistic Antifungal Nanotechnology for Pesticide Thiram by ZnO Nanoparticles, Scientific Reports (Jul. 14, 2014), 4(5408):1-9.
Morris et al., An International Termite Field Test of Wood Treated With Insecticides in a Buffered Amine Oxide Carrier, Forest Products Journal (2014), 64(5/6):156-160.
Pepin et al., Performances of White Pine and White Spruce Treated With Organic Fungicides Using an Aqueous Buffered Amine Oxide Preservation System, Bioresources (2019), 14(1)1264-288.

*Primary Examiner* — Nizal S Chandrakumar
(74) *Attorney, Agent, or Firm* — Debora Plehn-Dujowich; Eckert Seamans Cherin & Mellott, LLC

(57) ABSTRACT

The present invention relates to a solution for resisting destruction of living plants and a related method. A solution including a buffered amine oxide admixed with at least one material selected from the group consisting of insecticides and fungicides is applied to the living plant and provides a synergistically effective greater resistance to living plant deterioration than any of the individual buffered amine oxide, insecticides and fungicides achieve. A related method is disclosed.

55 Claims, No Drawings

(56) References Cited

U.S. PATENT DOCUMENTS

| | | |
|---|---|---|
| 2002/0065206 A1 | 5/2002 | Tseng et al. |
| 2009/0143334 A1 | 6/2009 | Ward et al. |
| 2012/0258248 A1 | 10/2012 | Ross |
| 2016/0286798 A1 | 10/2016 | Ward, Jr. et al. |
| 2019/0124920 A1 | 5/2019 | Clawson, Jr. et al. |
| 2022/0000104 A1 | 1/2022 | Clawson, Jr. et al. |

FOREIGN PATENT DOCUMENTS

| | | |
|---|---|---|
| WO | 2007135435 A2 | 11/2007 |
| WO | 2012138469 A1 | 10/2012 |
| WO | 2014191096 A1 | 12/2014 |
| WO | 2016160055 A1 | 10/2016 |

* cited by examiner

SOLUTIONS FOR ENHANCING THE EFFECTIVENESS OF INSECTICIDES AND FUNGICIDES ON LIVING PLANTS AND RELATED METHODS

CROSS REFERENCE TO RELATED APPLICATION

The present application is a 35 U.S.C. § 371 national phase from PCT International Application No. PCT/US2019/037851, filed Jun. 19, 2019 which is a Continuation of U.S. Continuation-in-part application Ser. No. 16/208,976, filed on Dec. 4, 2018, now U.S. Pat. No. 10,952,433, issued Mar. 23, 2021, which is a continuation-in-part of U.S. application Ser. No. 14/674,465, filed on Mar. 31, 2015 and is entitled "SOLUTIONS FOR ENHANCING THE EFFECTIVENESS OF INSECTICIDES ON LIVING PLANTS AND RELATED METHODS," the contents of each of which are incorporated herein by reference in their entirety.

BACKGROUND OF THE INVENTION

1. Field of the Invention

The present invention relates to an improved solution for enhancing protection of living plants through synergistic effects between buffered amine oxides and insecticides and fungicides and related methods.

2. Description of the Prior Art

Fungi, insects and other pests cause significant economic losses in food crop production as well as losses in forestry, tree plantations, pastures, flowers and other agricultural products. In addition, fungicide and insecticides have been employed in a wide variety of locations and types of uses to inhibit plant destruction due to fungus and insect pests. Problems created by insects and fungi have long existed in many environments including, but not limited to agriculture, parks, golf courses, residential environments, highways, vegetable gardens, railroad tracks, recreational facilities, floral gardens, forests, pastures, waterways and in many other environments. This can interfere with desired functionality, the health of plants, as well as the aesthetics of an area containing vegetation.

It has been known to use a wide variety of materials to protect living plants from insects and fungi. A wide variety of insecticides and fungicides have been employed in order to enhance the health of living plants and resist attack thereon by insects, fungi and other destructive organisms.

It has been known to introduce wood preservatives into lumber in order to resist deterioration of the same.

Ward, U.S. Pat. No. 7,896,960 discloses a method and solution for providing enhanced penetration of wood preservatives into wood to a greater depth through synergism between a buffering agent and an amine oxide. It contemplates the use of various types of wood preservatives on wood which has been severed from a living tree. Green lumber is also said to be treatable by the system.

This patent, which relates to wood as distinguished from living plants does include within the definition of wood preservatives, a number of chemical compounds including specific reference to fungicidal, insecticidal, water resistant, termite resistant materials.

U.S. Pat. No. 6,811,731 is directed toward a fire-retardant wood-based composite created by treating a green wood furnish with a phosphate/borate fire-retardant material. The fire-retardant treated green wood furnish is blended with a binder and then bound by applying pressure to form a non-leaching fire retardant wood based composite.

Walker, U.S. Pat. No. 6,572,788 discloses the use of amine oxides as wood preservatives. It states that the amine oxides inhibit microbial growth in wood. This patent relates to wood which has been severed from growing trees and discloses the use of wood preservatives which are said to inhibit destructive organisms such as fungi and sapstain, for example. It is directed toward preserving structural integrity of wood after the tree has been killed and resisting destruction of the resultant lumber as the prime objective.

Tseng, U.S. Pat. No. 6,508,869 discloses the use of amine oxides to enhance the performance of boron compounds as wood preservatives. There is mention of the amine oxides improving the effectiveness of boron compounds as insecticides or biocides and plant growth regulating agents. They are also said to provide better dispersion of boron compounds when applied to plants and fungi. It also makes reference to the seeds of plants and the area on which the plants or fungi grow.

There remains, therefore, a very real and substantial need for an improved system for resisting attacks on and destruction of living plants by insects and fungi.

SUMMARY OF THE INVENTION

The present invention provides a solution and method of obtaining synergistic action between a fungicide and a buffered amine oxide and/or an insecticide and a buffered amine oxide in order to provide enhanced resistance of a living plant to undesired deterioration due to fungi and insects.

The solution and related method provides for greater plant protection than would be obtained through use of the fungicide alone or the insecticide alone.

It is an object of the present invention to provide effective economical means for enhancing the performance of insecticides and fungicides on living plants.

It is another object of the present invention to provide a solution and related method which will enhance the performance of fungicides and insecticides on living plants.

It is another object of the present invention which, through synergism with a buffered amine oxide, enhances the performance of conventional insecticides and fungicides.

It is yet another object of the present invention to employ a synergistic combination of insecticides or fungicides with a buffered amine oxide system to produce improved insect and fungi resistance while employing a smaller quantity of the insecticide or fungicide.

These and other objects of the invention will be more fully understood from the following description of the invention.

DESCRIPTION OF THE PREFERRED EMBODIMENTS

As employed herein, the term "living plant" is used in its ordinary sense, and is to be distinguished from both (a) plants which have died and (b) products or items which once were, but are no longer living or part of a living plant such as, for example, lumber. This definition will include living plant food products such as fruits or vegetables which have been removed from a plant.

Living plants are characterized by the following:
(a) they secure energy from light, water and carbon dioxide, or from pre-existing carbon-based life forms, or from other forms of energy;
(b) they can grow through either reproductive cells and or evolutionary specialized cells that can differentiate into other kinds of cells to perform different functions;
(c) they have structures that allow them to resist loss of water, allow movement of water, allow movement of materials (such as sugars, minerals, hormones, wastes and microelements as examples), resist environmental forces (such as UV light, freezing and thawing, desiccation, submersion, blowing particles, fire, animal digestion, toxins and altitudes as examples);
(d) they conduct biochemical metabolic functions to live, grow, and reproduce through many types of cells or organelles that are designed by actively operating DNA, enzymes and other biologically active molecules;
(e) they compete for resources from other plants and other living organisms; and
(f) they die through natural or manmade forces.

As employed herein, a "buffer" or "buffer system" is an aqueous solution consisting of a mixture of a weak acid and its conjugate base or a weak base with its conjugate acid. A buffer system may also be obtained by adding a weak acid/conjugate base or a weak base/conjugate acid or by adding the weak acid/weak base and a strong acid/strong base in sufficient amount to form the conjugate acid/conjugate base.

A buffer is a solution that resists change in pH when an acid or base is added to it. A "single buffer" involves only one compound being added to a solution to make a buffer which internally contains a weak acid and its conjugate base or a weak base and its conjugate acid. A "dual buffer system" or "dual buffer" consists of two different buffering agents each of which has its own weak acid/conjugate base or weak base/conjugate acid or weak acid/weak base pairs which combine to provide the desired pH. The specific buffering system or buffers of the present invention are preferably all dual buffering systems or dual buffers.

The present invention involves creating a synergistic effect by applying to the plant a solution which includes of either an insecticide or a fungicide or both which will achieve a synergistically created improvement in the result through combining the same with a buffered amine oxide.

the 12 carbon length amine oxides such as that sold under the trade designation Barlox 12 and (b) a mixture of the 12 and 18 carbon lengths sold under the trade designation Barlox 1218. The buffer system has the property that the pH of the solution changes very little when a small amount of a strong acid or strong base is added to it. Buffer solutions are employed as a means of keeping pH at a nearly constant value within a wide range of chemical operations. In the present invention, the buffer system helps to maintain a substantially constant pH when in contact with biological systems, such as living plants.

The buffer system concepts can be extended to polyprotic species in which one or more protons may be removed to form different buffer systems, i.e., phosphate systems. Among the preferred buffers are ammonium salt/ammonia, Deprotonated Lysine/Doubly Deprotonated Lysine, Phosphate Dibasic, Potassium Bicarbonate/Potassium Carbonate.

Boric Acid/Borax, Potassium Phosphate Dibasic/Potassium Phosphate Tribasic, Ammonium Citrate Tribasic, and Potassium Phosphate Monobasic/Potassium Phosphate Dibasic.

It will be appreciated that the buffered amine oxides do not significantly alter the pH of the insecticide or fungicide products but, rather, make the pH much less likely to change based on the buffer capacity of the buffer additives.

A series of tests were performed in the United States in order to determine the effectiveness of a solution of the present invention combining an insecticide with a dual buffered amine oxide and the effectiveness of a solution of the present invention combining a fungicide with a buffered amine oxide.

TABLES 1-3 describe, respectively, describe the buffer systems employed in the North American experiments reported in TABLES 4 and 5, with TABLE 2 referring to the experimental method and TABLE 4 showing a group of buffer systems pH and total Ion strengths.

TABLE 1 recites the composition of buffer systems 3-4 that were used in the studies. Buffer systems 3-4 were prepared by dissolving the appropriate reagents into one liter of deionized water until a homogenous solution was obtained. TABLE 4 shows, in the left hand column, the number assigned to a particular buffer with column 2 containing the abbreviated name or full name of the buffers. The amount of acidic chemical per liter and basic chemical per liter appear in the next two pairs of columns.

TABLE 1

Buffer Systems 3, 4 Composition

| Buffer No. | Buffer System Name (Abbreviated Name) | Acidic Chemical (per liter) Amount | Acidic Chemical (per liter) Name | Basic Chemical (per liter) Amount | Basic Chemical (per liter) Name |
|---|---|---|---|---|---|
| 3 | Potassium Phosphate Monobasic/Potassium Phosphate Dibasic (Phosphate Buffer 1) | 0.5 mol | Potassium Phosphate Monobasic | 0.5 mol | Potassium Phosphate Dibasic |
| 4 | Potassium Bicarbonate/Potassium Carbonate (Carbonate Buffer) | 0.5 mol | Potassium Bicarbonate | 0.5 mol | Potassium Carbonate |

The amine oxides may be mixed with buffers in a solvent to create a buffered amine oxide solution and then mixed with an insecticide and/or fungicide solution. The preferred amine oxides are selected from the group consisting of (a)

TABLE 2 is directed toward the experimental method in preparation of the pre-blended amine oxide and buffer systems. The compositions of buffer system identifies the buffer system name in the first column with the next two columns providing identification of the acidic chemical and weight percent amount followed by the amount of basic chemical and the name. The last two columns provide, respectively, the water weight percent and Barlox 12 (30% by weight amine oxide donor) weight percent.

TABLE 2 discloses the composition of pre-blended Amine Oxide and Buffer System 3 that was used in the studies. Buffer system 3 was prepared by dissolving the appropriate reagent salts in water and then adding the amine oxide donor in sufficient amount to make one liter of solution.

of a mixture of a weak acid in its conjugate or a weak base in its conjugate acid. One may obtain the desired buffer system by directly adding the weak acid/conjugate base or weak base/conjugate acid salts or by adding the weak acid/weak base and a strong acid/strong base in sufficient amount to form the conjugate acid/conjugate base.

The amine oxide additives may be mixed as tank blends with the insecticides or fungicides or may be incorporated into the insecticides or fungicide formulas.

TABLE 2

| | | Pre-blended Buffer System 3 Composition | | | | |
|---|---|---|---|---|---|---|
| | | Acidic Chemical | | Basic Chemical | | Water | Barlox 12 (30% by weight amine oxide) Amine oxide |
| Buffer Letter | Buffer System Name (Abbreviated Name) | Amount (wt %) | Name | Amount (wt %) | Name | Amount (wt %) | Donor (wt %) |
| 3 | Potassium Phosphate Monobasic/Potassium Phosphate Dibasic (Phosphate Buffer 3) | 4.36 | Potassium Phosphate Monobasic | 3.13 | Potassium Phosphate Dibasic | 12.51 | 80.00 |

TABLE 3 shows the pH and buffer total Ion strengths (Molar) for buffer systems 3 and 4.

TABLE 3

| | Buffer System pH and Total Ion Strengths | | |
|---|---|---|---|
| Buffer No. | Buffer System Name (Abbreviated Name) | pH (Buffer System) | Buffer Total Ion Strength (Molar) |
| 3 | Potassium Phosphate Monobasic/Potassium Phosphate Dibasic (Phosphate Buffer 1) | 6.8 | 1.05M |
| 4 | Potassium Bicarbonate/ Potassium Carbonate (Carbonate Buffer) | 10.2 | 0.995M |

Referring to TABLES 4 and 5, the columns under the heading Buffered Amine Oxide System correspond to the identification provided in TABLES 1 through 3.

In general, in the present invention, amine oxides were mixed with buffers and then added to insecticide or fungicide formulations. Among the preferred amine oxides were those of 12 carbon length such as that sold under the trade designation Barlox 12 and a mixture of the 12 and 18 carbon lengths sold under the trade designation Barlox 1218. The buffer solution serves to stabilize the pH at a nearly constant value in a wide variety of chemical operations.

In the present invention, the buffer system maintains a substantially constant pH when in contact with biological systems. The buffer system is an aqueous system consisting TABLE 1 shows 2 different buffers, while TABLE 3 shows an amine oxide blend. TABLE 4 discloses systems wherein the appropriate reagents were dissolved in deionized water until a homogenous solution was obtained. TABLE 3 deals with the pre-blending of the amine oxide and buffer systems with the appropriate reagents salts dissolved in water and subsequently, adding the amine oxide donor.

Except where the fungicide or insecticide is listed in column 1 of the table and identified by concentrations in terms of PPM which involves totals of the amount present on the basis of total solution weight, with respect to the other columns of the table refer to concentration on a total solution volume basis.

In employing the tests which generated the data recited in Table 4, a water control employing twenty seedlings 20 milliliters per seedling of low volume hand spray showed 100% staining fungi in the stem wound as indicated in the first number in the last column of Table 4. The buffers and amine oxide employed are shown in Tables 1 through 3. Protocol involved seven days after application, a sterile razor blade wound of about 2 millimeters by 10 millimeters was established on each seedling stem. Fourteen days after the stem wounding, wounds were examined for the presence of staining fungi. In creating these for solution were used the buffer and amine oxides were added to the dilute solution of fungicide.

American Field Tests of Buffered Amine Oxide Additives to Fungicide and Insecticide (Tables 4 and 5)

TABLE 4

May to Jun. 2013

| Fungicide Type Product Concentration | No Buffer | | Buffered Amine Oxide System Buffer Number & Amine Oxide Donor or Letter | | | | Percent of Seedlings with Staining |
|---|---|---|---|---|---|---|---|
| | | | 3 | | 4 | | |
| PPM | 12 | 1218 | 12 | 1218 | 12 | 1218 | Fungi in Stem |
| Propiconazole | | | | | | | Wound of White Oak |
| | | | | | | | 100[1][2] |
| | 200:1 | | | | | | 100 |
| | 400:1 | | | | | | 100 |
| | | 200:1 | | | | | 100 |
| | | 400:1 | | | | | 100 |
| 200 PPM | | | | | | | 20 |
| 100 PPM | | | | | | | 80 |
| 50 PPM | | | | | | | 100 |
| 50 PPM | | | 200:1 | | | | 0 |
| 50 PPM | | | 400:1 | | | | 20 |
| 50 PPM | | | | 200:1 | | | 0 |
| 50 PPM | | | | 400:1 | | | 0 |
| | | | 200:1 | | | | 100 |
| | | | 400:1 | | | | 100 |
| | | | | 200:1 | | | 100 |
| | | | | 400:1 | | | 100 |
| 50 PPM | | | | | 200:1 | | 0 |
| 50 PPM | | | | | 400:1 | | 20 |
| 50 PPM | | | | | | 200:1 | 0 |
| 50 PPM | | | | | | 400:1 | 0 |
| | | | | | 200:1 | | 100 |
| | | | | | 400:1 | | 100 |
| | | | | | | 200:1 | 100 |
| | | | | | | 400:1 | 100 |

Referring to TABLE 4 wherein a commonly used fungicide, Propiconazole was employed in tests in the amount of 50:200 PPM (parts per million) employed with and without buffered amine oxides systems 3 and 4 with some of the tests employing the 12 carbon length and others, the 1218 carbon mixture. In a preferred embodiment in 1218 on a weight basis, the 12 carbon length will be present in an amount of about 1.3 to 2.0 times the amount of 18 carbon length and in the preferred range about 1.5 to 1.8 times the amount of 18 carbon length. The tests were performed on white oak seedlings which were provided with a stem wound in which was introduced staining fungi which was of the ceratocystis variety. Staining indicates that the fungicide or other treatment did not resist growth of the fungi with the number 100 representing 100% with no inhibitions of fungi growth and the number 0 indicating 0% or 0 indicating no fungi growth.

Referring in TABLE 4 to the heading under No Buffer, it is seen that the amine oxides of both the 12 and 1218 length in concentrations of 200:1 and 400:1 did not in any way inhibit growth of the staining fungi. Considering the Propiconazole employed alone, it is seen that with 50 ppm, 100 ppm and 200 ppm, the inhibition at 50 ppm did not exist as there was 100% growth and that at 100 ppm, 80% growth was experienced, while at 200 ppm, 20% growth existed.

With continued reference to TABLE 4, the combination of the fungicide with the buffered amine oxide system No. 3, employing 50 ppm in the 12 carbon length combined with 50 ppm propiconazole, at 200:1 concentration, there was 0 fungal growth, and at 400:1, there was 20% growth. The same 50 ppm of the fungicide employed with 200:1 and 400:1, 1218 buffered amine oxide system No. 3, produced 0 fungal growth.

TABLE 4 shows that both the 12 and 1218 length of buffered amine oxide system No. 3 used alone at concentrations of 200:1 and 400:1 produced no fungal growth inhibition as both showed 100% staining fungi.

Considering buffered amine oxide system No. 4 when the 12 length is used in combination with 50 ppm of the fungicide, in concentration of 400:1, 20% fungal growth was experienced and in 200:1, no fungal growth was experienced. With regard to the fungicide being in 50 ppm and the 1218 carbon length, a buffered amine oxide system No. 4, as to both 200:1 and 400:1 concentration, there was 0 fungal growth.

Considering both the 12 length and 1218 length employed without the fungicide in both concentrations, 200:1 and 400:1, there was a 100% fungal growth.

The test results in TABLE 4, therefore, support the conclusion that, in the absence of a buffer, there was 100% fungal growth. In the use of 12 length amine oxide or 1218 length amine oxide alone with both buffered amine systems No. 3 and 4, there was 100% fungal growth. When, however, the combination of fungicide and the buffered amine oxide systems were employed, whether length 12 or 1218 was considered, when the concentration was 200:1, there was no fungal growth and when the concentration was 400:1, there was 20% fungal growth.

The method of testing the materials was to spray the trunk of the seedling with the particular solution being tested and 7 days after such application, creating a wound of approximately 2 millimeters by 10 millimeters on each seedling stem. Fourteen days after the wounding, the wounds were examined for the presence of staining fungi.

TABLE 5

| Insecticide Type Product Concentration | Buffered Amine Oxide System Buffer Number & Amine Oxide Donor or Letter | | | Percent Gypsy Moth Caterpillar |
|---|---|---|---|---|
| PPM Permethrin | No Buffer 12 | 3 12 | 4 12 | Damage to White Oak 1 Month After Application |
|  |  |  |  | 100[1][2] |
|  | 200:1 |  |  | 100 |
|  | 400:1 |  |  | 100 |
| 100 PPM |  |  |  | 0 |
| 50 PPM |  |  |  | 30 |
| 10 PPM |  |  |  | 80 |
| 10 PPM |  | 200:1 |  | 0 |
| 10 PPM |  | 400:1 |  | 10 |
|  |  | 200:1 |  | 100 |
|  |  | 400:1 |  | 100 |
| 10 PPM |  |  | 200:1 | 0 |
| 10 PPM |  |  | 400:1 | 10 |
|  |  |  | 200:1 | 100 |
|  |  |  | 400:1 | 100 |

Referring to TABLE 5, there is shown the results of testing of an insecticide which, in this case, was permethrin, which was presented in various tests in quantities of 10 ppm to 50 ppm and 100 ppm concentrations were tested against a control with no buffer as well as buffer amine oxide systems employing 12 length carbon.

The particular solutions tested were applied to a stem of the white oak seedling using a low volume hand spray and spraying 20 milliliters per seedling. A total of 20 seedlings were tested. The use of permethrin alone in concentration of 10 ppm resulted in 80% gypsy moth caterpillar damage. At permethrin concentration of 50 ppm, the damage after one month was 30% and with 100 ppm used alone, the damage was 0. When buffered amine oxide system No. 3 was employed in concentrations of 400:1 with 10 ppm of the insecticide, the gypsy moth caterpillar damage was 10% and when a concentration of 200:1 was employed with 10 ppm insecticide, the damage was 0. This shows that a much smaller amount of insecticide was needed to achieve 0 damage when was used in combination with the buffered amine oxide system which created a desired synergistic effect. If less than 50 percent of the leaf mass was eaten, this shows successful inhibition of gypsy moth damage.

Using buffered amine oxide system No. 3 alone in concentrations of 400:1 and 200:1 resulted in 100% gypsy moth caterpillar damage after one month.

Using buffered amine oxide system No. 4 in combination with 10 ppm of the insecticide, reduce the gypsy moth caterpillar damage to 10% when using a concentration of 400:1 and to 0 when using a concentration of 200:1.

Using buffered amine oxide system No. 4 without the insecticide resulted in 100% gypsy moth caterpillar damage.

The foregoing tests show that neither buffered amine oxide system 3 nor 4 in concentrations of 200:1 and 400:1 produced any measurable difference in gypsy moth caterpillar damage over the control which had neither insecticide nor buffered amine oxide systems. When, however, the buffered amine oxide systems 3 and 4 were employed with insecticide concentrations of 10 ppm, at 400:1 concentration of the 12 length carbon buffered amine oxide systems, there was only 10% gypsy moth caterpillar damage and with 200:1 concentration, there was 0 damage.

If desired, a single solution may contain both an insecticide and a fungicide.

Extensive additional testing of a wide variety of fungicides was done in an effort to confirm the performance of the present invention. The data is presented in Table 6.

In performing the tests employing ten red oak seedlings per iteration with the materials being tested applied at approximately 12 milliliters per seeding applied with a low volume hand spray. The red oak (*Quercus rubra*) was then tested during the period of Aug. 28, 2017 through Oct. 5, 2017 in suburban Pittsburgh, Pa. in assignee's agricultural greenhouse. All fungicides employed in the test were registered by the United States environmental protection agency for use as pesticides. Seven days after application, a sterile razor blade wound of approximately 2 millimeters by 10 millimeters was created on each seedling stem Immediately after, the wounding 1 ml of macerated fungal blend suspended in distilled water was applied to each stem wound. Twenty-eight days after wounding, the wounds were evaluated for an average percentage of staining fungi present in each seedling stem wound. Opaque black straw covering was applied to each wound. The opaque black straws were applied within about one minute after wounding and inoculation with the fungi. The straws are simple polypropylene straws as employed in the food industry, for example. They are wider than the normal straws as they are employed in the health industry for patients needing such straws. They are sterile. The purpose for using such straws is to facilitate the creation of a dark environment on the wound as fungi tend to like dark damp places. This is employed to enhance the effectiveness of the test by accelerating the severity of the fungal growing conditions. Each stem wound was given two ml of distilled water 10, 17, 21 and 28 days after wounding by a low volume trigger spray. All solutions were included a porpylene glycol based dye at a concentration of 100:1. The greenhouse conditions were maintained at 65° F. to 85° F. and the humidity range of 30 to 80% relative humidity. The test which employed the combination of thiabendazole, fludioxonil and azoxystrobin was obtained as a formulated pesticide product which was available under the trade designation "Sporgard".

It will be appreciated from the following analysis and the data which contains the results of testing a large number of fungicides with various quantities and with various combinations of materials including the preferred composition of the present invention. Among the preferred fungicides which were tested are Thiabendazole, Fludioxonil, Azoxystrobin, Chlorothalonil, Propiconazole, Mancozeb, Vinclozolin, and Mefenoxam.

The resulting conclusion as demonstrated by the tests results is that applicant's invention permits the use of substantially less fungicides, while achieving equal or better results. This can contribute to the end user saving money.

The general format of tables 6 through 8 will involve the first column identifying the absence of or quantity of a fungicide or identity of the fungicide as well as controls. The use in column 1 of "(No Water Control)" means that neither water nor dye were employed. The use of "(No Dye Control)" means that there was no dye employed with only water being employed as a control. The dye when used was added to show that the test article was adequately covered in the needed area with the same volume of treatment. The controls also function to confirm that no influences from inert coformulants occurred. The second column will indicate the quantity in parts per million of the fungicide employed. With the third through fifth columns involve concentrations of 200:1. The third column will identify concentrations of the chosen buffer systems which in this series of tests were buffer systems 3 and 4 as defined in Tables 1 through 3.

The third column which deals with two buffer systems, but no amine oxide.

The fourth column employs amine oxides without a buffer. The fourth column deals with the amine oxide without a buffer.

The fifth column deals with the use of buffered amine oxide system and buffer identity. The final column is a numerical grade which represents the percent of staining fungi coverage in percentage in the stem wound of the red oak seedlings as measured on day 28.

TABLE 6

| Fungicide Type | Product Concentration PPM | No Amine Oxide Buffer System 4 | No Amine Oxide Buffer System 3 | Amine Oxide (No Buffer) 12 | Amine Oxide (No Buffer) 1218 | Buffer System 4 12 | Buffer System 4 1218 | Buffer System 3 12 | Buffer System 3 1218 | Percent of Staining Fungi |
|---|---|---|---|---|---|---|---|---|---|---|
| No Fungicide | 0 | | | | | | | | | 64 |
| No Fungicide | 0 | 200:1 | | | | | | | | 85 |
| No Fungicide | 0 | | 200:1 | | | | | | | 67 |
| No Fungicide | 0 | | | 200:1 | | | | | | 77 |
| No Fungicide | 0 | | | | 200:1 | | | | | 56 |
| No Fungicide | 0 | | | | | 200:1 | | | | 61 |
| No Fungicide | 0 | | | | | | | 200:1 | | 69 |
| No Fungicide | 0 | | | | | | 200:1 | | | 78 |
| No Fungicide | 0 | | | | | | | | 200:1 | 94 |
| No Fungicide (No water Control) | 0 | | | | | | | | | 77 |
| No Fungicide (No Dye Control) | 0 | | | | | | | | | 54 |
| Thiabendazole, Fludioxonil, Azoxystrobin | 160 | | | | | | | | | 72 |
| Thiabendazole, Fludioxonil, Azoxystrobin | 160 | 200:1 | | | | | | | | 92 |
| Thiabendazole, Fludioxonil, Azoxystrobin | 160 | | | 200:1 | | | | | | 59 |
| Thiabendazole, Fludioxonil, Azoxystrobin | 160 | | | | 200:1 | | | | | 19 |
| Thiabendazole, Fludioxonil, Azoxystrobin | 160 | | | | | | | 200:1 | | 25 |
| Thiabendazole, Fludioxonil, Azoxystrobin | 160 | | | | | | 200:1 | | | 36 |
| Thiabendazole, Fludioxonil, Azoxystrobin | 160 | | | | | | | | 200:1 | 26 |
| Thiabendazole, Fludioxonil, Azoxystrobin | 320 | | | | | | | | | 40 |
| Thiabendazole, Fludioxonil, Azoxystrobin | 640 | | | | | | | | | 22 |
| Chlorothalonil | 1235 | | | | | | | | | 91 |
| Chlorothalonil | 1235 | 200:1 | | | | | | | | 41 |
| Chlorothalonil | 1235 | | 200:1 | | | | | | | 72 |
| Chlorothalonil | 1235 | | | 200:1 | | | | | | 64 |
| Chlorothalonil | 1235 | | | | 200:1 | | | | | 55 |
| Chlorothalonil | 1235 | | | | | 200:1 | | | | 24 |
| Chlorothalonil | 1235 | | | | | | | 200:1 | | 27 |
| Chlorothalonil | 1235 | | | | | | 200:1 | | | 33 |
| Chlorothalonil | 1235 | | | | | | | | 200:1 | 33 |
| Chlorothalonil | 2470 | | | | | | | | | 49 |
| Chlorothalonil | 4940 | | | | | | | | | 37 |
| Propiconazole | 100 | | | | | | | | | 85 |
| Propiconazole | 100 | 200:1 | | | | | | | | 77 |
| Propiconazole | 101 | | | 200:1 | | | | | | 74 |
| Thiabendazole, Fludioxonil, Azoxystrobin | 160 | | | 200:1 | | | | | | 67 |

TABLE 6-continued

| Fungicide Type | Product Concentration PPM | No Amine Oxide Buffer System 4 | No Amine Oxide Buffer System 3 | Amine Oxide (No Buffer) 12 | Amine Oxide (No Buffer) 1218 | Buffer System 4 12 | Buffer System 4 1218 | Buffer System 3 12 | Buffer System 3 1218 | Percent of Staining Fungi |
|---|---|---|---|---|---|---|---|---|---|---|
| Thiabendazole, Fludioxonil, Azoxystrobin | 160 | | | 200:1 | | | | | | 52 |
| Propiconazole | 102 | | | 200:1 | | | | | | 43 |
| Propiconazole | 103 | | | | 200:1 | | | | | 55 |
| Propiconazole | 104 | | | | | 200:1 | | | | 13 |
| Propiconazole | 105 | | | | | | 200:1 | | | 20 |
| Propiconazole | 106 | | | | | | | 200:1 | | 33 |
| Propiconazole | 107 | | | | | | | | 200:1 | 44 |
| Propiconazole | 200 | | | | | | | | | 81 |
| Propiconazole | 400 | | | | | | | | | 33 |
| Mancozeb | 1097 | | | | | | | | | 74 |
| Mancozeb | 1097 | 200:1 | | | | | | | | 77 |
| Mancozeb | 1097 | | 200:1 | | | | | | | 67 |
| Mancozeb | 1097 | | | 200:1 | | | | | | 58 |
| Mancozeb | 1097 | | | | 200:1 | | | | | 30 |
| Mancozeb | 1097 | | | | | 200:1 | | | | 9 |
| Mancozeb | 1097 | | | | | | 200:1 | | | 24 |
| Mancozeb | 1097 | | | | | | 200:1 | | | 23 |
| Mancozeb | 1097 | | | | | | | | 200:1 | 30 |
| Mancozeb | 2194 | | | | | | | | | 35 |
| Mancozeb | 4388 | | | | | | | | | 22 |
| Vinclozolin | 122 | | | | | | | | | 43 |
| Vinclozolin | 122 | 200:1 | | | | | | | | 55 |
| Vinclozolin | 122 | | 200:1 | | | | | | | 49 |
| Vinclozolin | 122 | | | 200:1 | | | | | | 32 |
| Vinclozolin | 122 | | | | 200:1 | | | | | 16 |
| Vinclozolin | 122 | | | | | 200:1 | | | | 7 |
| Vinclozolin | 122 | | | | | | 200:1 | | | 17 |
| Vinclozolin | 122 | | | | | | | 200:1 | | 34 |
| Vinclozolin | 122 | | | | | | | | 200:1 | 38 |
| Vinclozolin | 244 | | | | | | | | | 21 |
| Vinclozolin | 488 | | | | | | | | | 15 |
| Mefenoxam | 20 | | | | | | | | | 64 |
| Mefenoxam | 20 | 200:1 | | | | | | | | 55 |
| Mefenoxam | 20 | | 200:1 | | | | | | | 52 |
| Mefenoxam | 20 | | | 200:1 | | | | | | 38 |
| Mefenoxam | 20 | | | | 200:1 | | | | | 25 |
| Mefenoxam | 20 | | | | | 200:1 | | | | 14 |
| Mefenoxam | 20 | | | | | | 200:1 | | | 16 |
| Mefenoxam | 20 | | | | | | | 200:1 | | 25 |
| Mefenoxam | 20 | | | | | | | | 200:1 | 21 |
| Mefenoxam | 40 | | | | | | | | | 42 |
| Mefenoxam | 80 | | | | | | | | | 23 |

Referring more specifically to Table 6 (pages 14-17) with reference to the first nine entries wherein no fungicide was employed, it is seen that where buffer systems 4 and 3 were employed without an amine oxide in concentrations of 200:1, the scores were 67% and 85%.

As to the amine oxide without buffer and carbon lengths of 12 and 1218, the percentages were respectively 77 and 56. As shown in the next column employed the buffered amine oxide system of the present invention. Both buffered amine oxide and buffer 4 or buffer 3, each with carbon lengths of either 12 or 1218 were employed. Staining percentages were 61 and 78 with respect to buffer system 4 with the 12 carbon length performing better than the 1218 carbon length. Also, with respect to buffer system 3 in combination with the amine oxide, the percentage was 69 with respect to 12 carbon length and 94 with respect to 1218 carbon length.

In summary, on the basis of the absence of use of any fungicide, the percentage stain varied from a low of 56 to a high of 94.

Referring to Table 6, tests were performed employing a combination of Thiabendazole, Fludioxonil, Azoxystrobin, which combination is offered commercially under the trade designation "Sporgard" with a composition of 19.04% Thiabendazole, 19.04% Azoxystrobin and 1.92% Fludioxonil, Propiconazole, Mancozeb, Vinclozolin and Mefenoxam. In all but the last two tests employing this combination, a 160 ppm (parts per million) based on total solution weight was employed. It is noted when it was employed alone the fungi covering was 72. With the fungicide and no amine oxide and the buffer systems 4 and 3, respectively, were at 92 and 67.

The amine oxide without buffer in lengths of 12 and 1218 produced 52 and 59 staining Buffer system 4 in combination with the buffered amine oxide in lengths of 12 and 1218, respectively, produced 19 and 36 which was a substantial improvement over the other preceding categories without the amine oxide or without the buffer. Similarly, the buffered amine oxide employing buffer system 3 with 12 and 1218 carbon length produced 25 and 26 respectively.

With the two tests employing the fungicide in increased amounts of 320 ppm and 640 ppm, without any of the other materials, the results were respectively 40 and 22. These series of tests show that successful results can be obtained while using the fungicide in the amount of 160 ppm with the buffered amine oxides system of the invention producing comparable results while permitting a reduction in the amount of fungicide employed.

In Table 6, results of the use of chlorothalonil were compared. The chlorothalonil in amount of 1235 ppm used alone resulted in a very unsatisfactory 91 staining fungi coverage. When it was employed in the same quantity with no amine oxide, but buffer concentrations of 200:1 for buffer systems 4 and 3, respectively, the results were 41 and 72. Testing the same fungicide with 200:1 concentration of the fungicide with amine oxides with no buffer, the results were respectively 64 and 55 staining.

The chlorothalonil fungicide employed with buffered amine oxide employing buffer system 4 and the fungicide concentration of 200:1 and carbon length of 12 and 1218 produced good results of 24 and 33, respectively. The buffered amine oxides system employing buffer system 3 and carbon lengths 12 and 1218, respectively, produced results of 27 and 33. When the chlorothalonil fungicide was used alone in the amount of 2470 ppm, the percent of staining was 49 and when 4940 ppm was employed, the percent staining was 37. As a result, the use of the unique combination of the invention produced superior stain fungi coverage resistance when 1235 ppm of the fungicide was used compared with the use of the fungicide alone in much greater quantities. These tests confirmed the fact that one may get superior results with the formulation of the present invention employing a reduced amount of fungicide as compared with (a) the fungicide employed alone, and (b) when the buffer was used without the amine oxide and when the amine was used without the buffer.

Table 6 also provides test results employing the fungicide Propiconazole. When the propiconazole was used alone, the percentage of staining was 85. Employing the buffer systems 4 and 3 without amine oxide, resulted in staining percentage, respectively, at a concentration of 200:1 of 77 and 74. Use of amine oxide without a buffer in lengths 12 and 1218, showed staining percentage of 43 and 55, respectively.

Employing the buffered amine system 4 in carbon lengths of 12 and 1218, respectively, produced results of 13 and 33. Employing the buffered amine oxide system with buffer system 3 and lengths 12 and 1218, produced staining at 20 and 44. It is noted that in these tests, the amount of propiconazole ranged from 100 ppm to 107 ppm and at 107, the result was 44. Further increases in propiconazole to 200 ppm and 400 ppm produced 81 and 33. This series of tests shows that employing the formulation of the invention with different buffer systems and carbon lengths of 12 and 1218 created successful staining fungi resistance compared with substantially increasing the percentage propiconazole without employing the formulations of the present invention.

As shown in Table 6, tests were performed with the fungicide Mancozeb with all but the last two tests having a concentration of 1097 ppm. Fungicide concentration with no other ingredients, the percent staining fungi was 74. When buffer systems 4 and 3 were employed without amine oxide, the numbers were respectively, 77 and 67. When the same quantity of Mancozeb was employed with amine oxide with no buffer, the 12 and 1218 carbon lengths performed at 58 and 30.

When the buffered amine oxide system of the present invention was employed, buffer system 3 had values of 24 and 30 and buffer system 4 with lengths 12 and 1218, respectively, had values of 9 and 23. When the concentration of mancozeb was increased to 2194 ppm and 4388 ppm, the numbers were 35 and 22. These numbers, respectively, were not any more effective and generally less effective than the fungicide employed at 1097 ppm. As a result, it is apparent that a smaller quantity of fungicide may be employed when it is used with the buffered amine oxide systems of the present invention.

With no buffer or amine oxide, the result was 43 and when the fungicide, Vinclozolin, was employed at 122 ppm, with no amine oxide, the results were 55 and 49 with the formulation being 200:1. When it was employed with amine oxide, but no buffer in the carbon lengths 12 the percentage of staining was 32 and in carbon lengths 1218, it was 16.

Use at this level with 200:1 concentration and buffer system 4 at carbon length 12 and carbon length 1218, produced results of 7 and 34. Buffer system 3 producing results, respectively, of 17 and 38. When the amount of Vinclozolin was increased to 244 ppm, which is double that of the next preceding test result, and 488 ppm, the results were respectively 21 and 15. As a result, this data with Vinclozolin establishes the fact that with the buffered amine oxide system formulation of the present invention, substantially less fungicide can be employed with equal or better results in terms of percent of stain fungi.

In Tables 6, there is reported data from tests of Mefenoxam with all but the last two tests employing 20 ppm of the fungicide. The other components when employed were used in a concentration of 200:1. The mefenoxam alone produced a result of 64. Buffer systems 4 and 3, respectively, without amine oxide produced results of 55 and 52 and amine oxide system without the buffer in lengths 12 and 1218, respectively, produced results of 38 and 25. With the preferred buffered amine system in carbon lengths of 12 and 1218, the results were 14 and 25, respectively, and for buffer system 3 were 16 and 21, respectively. By contrast, doubling the mefenoxam to 40 ppm without the buffered amine oxide system, produced a result of 42 and mefenoxam at 80 ppm, without the buffered amine oxide, produced a result of 23. These results confirm the fact that employing the buffered amine oxide of the present invention permits the use of a much smaller quantity of fungicide with better or equivalent results.

In evaluating the test results, it is noted that the staining fungal inhibition was substantially better employing applicant's buffered amine oxide system with the preferred 4 and 3 buffer systems. It will also be noted that the 12 carbon length and 1218 carbon length both performed effectively. In each instance, the buffered amine oxide system was more effective in inhibiting staining fungi over (a) the tests with no fungicide, (b) the tests with no amine oxide, and (c) the tests with amine oxide, but no buffer.

A series of tests involving exposure of living plants which had been treated with a variety of insecticides and buffered amine oxide systems of the present invention were conducted. These tests included comparative tests wherein no insecticide was used, tests where no amine oxide was used, tests where no buffer was employed, but carbon lengths of 12 and 1218 were employed and, finally, where two different buffered amine oxide systems of the present invention were employed with 12 carbon length and 1218 carbon length. In all of these tests, when the dosage of the insecticide was increased by approximately 50% or 100%, these results reflect the use of only the insecticide.

TABLE 7

| Insecticide | Product Concentration PPM | No Amine Oxide CO3 | No Amine Oxide PO4 | No Buffer 12 | No Buffer 1218 | CO3 12 | CO3 1218 | PO4 12 | PO4 1218 | Percent Lepidopteran Damage to Romaine Lettuce 24 hr |
|---|---|---|---|---|---|---|---|---|---|---|
| No insecticide | 0 | | | | | | | | | 41.0 |
| No Insecticide | 0 | 200:1 | | | | | | | | 32.5 |
| No Insecticide | 0 | | 200:1 | | | | | | | 42.5 |
| No Insecticide | 0 | | | 200:1 | | | | | | 48.0 |
| No Insecticide | 0 | | | | 200:1 | | | | | 41.5 |
| No Insecticide | 0 | | | | | 200:1 | | | | 28.0 |
| No insecticide | 0 | | | | | | 200:1 | | | 45.0 |
| No Insecticide | 0 | | | | | | | 200:1 | | 47.5 |
| No insecticide | 0 | | | | | | | | 200:1 | 60.0 |
| No insecticide (No water Control) | 0 | | | | | | | | | 55.0 |
| No Insecticide (No Dye Control) | 0 | | | | | | | | | 45.5 |
| Chlorantranilopril | 60 | | | | | | | | | 10.5 |
| Chlorantranilopril | 60 | 200:1 | | | | | | | | 13.5 |
| Chlorantranilopril | 60 | | 200:1 | | | | | | | 9.0 |
| Chlorantranilopril | 60 | | | 200:1 | | | | | | 9.0 |
| Chlorantranilopril | 60 | | | | 200:1 | | | | | 5.5 |
| Chlorantranilopril | 60 | | | | | 200:1 | | | | 2.5 |
| Chlorantranilopril | 60 | | | | | | 200:1 | | | 4.0 |
| Chlorantranilopril | 60 | | | | | | | 200:1 | | 2.5 |
| Chlorantranilopril | 60 | | | | | | | | 200:1 | 0.0 |
| Chlorantranilopril | 90 | | | | | | | | | 8.2 |
| Chlorantranilopril | 120 | | | | | | | | | 8.5 |
| Acephate | 70 | | | | | | | | | 22.7 |
| Acephate | 70 | 200:1 | | | | | | | | 31.0 |
| Acephate | 70 | | 200:1 | | | | | | | 20.0 |
| Acephate | 70 | | | 200:1 | | | | | | 36.0 |
| Acephate | 70 | | | | 200:1 | | | | | 28.0 |
| Acephate | 70 | | | | | 200:1 | | | | 11.5 |
| Acephate | 70 | | | | | | 200:1 | | | 7.5 |
| Acephate | 70 | | | | | | | 200:1 | | 4.5 |
| Acephate | 70 | | | | | | | | 200:1 | 1.0 |
| Acephate | 105 | | | | | | | | | 16.5 |
| Acephate | 140 | | | | | | | | | 13.0 |
| Methoxyfenozide | 100 | | | | | | | | | 29.5 |
| Methoxyfenozide | 100 | 200:1 | | | | | | | | 13.5 |
| Methoxyfenozide | 100 | | 200:1 | | | | | | | 22.0 |
| Methoxyfenozide | 100 | | | 200:1 | | | | | | 28.0 |
| Methoxyfenozide | 100 | | | | 200:1 | | | | | 13.0 |
| Methoxyfenozide | 100 | | | | | 200:1 | | | | 8.0 |
| Methoxyfenozide | 100 | | | | | | 200:1 | | | 7.5 |
| Methoxyfenozide | 100 | | | | | | | 200:1 | | 9.0 |
| Methoxyfenozide | 100 | | | | | | | | 200:1 | 4.5 |
| Methoxyfenozide | 150 | | | | | | | | | 43.0 |
| Methoxyfenozide | 200 | | | | | | | | | 23.5 |
| Spinosad | 30 | | | | | | | | | 28.5 |
| Spinosad | 30 | 200:1 | | | | | | | | 17.0 |
| Spinosad | 30 | | 200:1 | | | | | | | 20.5 |
| Spinosad | 30 | | | 200:1 | | | | | | 24.5 |
| Spinosad | 30 | | | | 200:1 | | | | | 22.5 |
| Spinosad | 30 | | | | | 200:1 | | | | 12.5 |
| Spinosad | 30 | | | | | | 200:1 | | | 10.0 |
| Spinosad | 30 | | | | | | | 200:1 | | 9.5 |
| Spinosad | 30 | | | | | | | | 200:1 | 6.5 |
| Spinosad | 45 | | | | | | | | | 17.0 |
| Spinosad | 60 | | | | | | | | | 19.0 |
| Permethrin | 10 | | | | | | | | | 77.0 |
| Permethrin | 10 | 200:1 | | | | | | | | 80.5 |
| Permethrin | 10 | | 200:1 | | | | | | | 83.0 |
| Permethrin | 10 | | | 200:1 | | | | | | 77.5 |
| Permethrin | 10 | | | | 200:1 | | | | | 72.0 |
| Permethrin | 10 | | | | | 200:1 | | | | 22.5 |
| Permethrin | 10 | | | | | | 200:1 | | | 24.0 |
| Permethrin | 10 | | | | | | | 200:1 | | 28.0 |
| Permethrin | 10 | | | | | | | | 200:1 | 21.0 |
| Permethrin | 15 | | | | | | | | | 78.0 |
| Permethrin | 20 | | | | | | | | | 90.0 |
| Indoxacarb | 50 | | | | | | | | | 47.0 |
| Indoxacarb | 50 | 200:1 | | | | | | | | 50.5 |
| Indoxacarb | 50 | | 200:1 | | | | | | | 25.5 |
| Indoxacarb | 50 | | | 200:1 | | | | | | 26.5 |

TABLE 7-continued

| Insecticide | Product Concentration PPM | No Amine Oxide | | No Buffer | | Buffered Amine Oxide System Buffer Number & Amine Oxide Donor or Letter | | | | Percent Lepidopteran Damage to Romaine Lettuce 24 hr |
|---|---|---|---|---|---|---|---|---|---|---|
| | | | | | | CO3 | | PO4 | | |
| | | CO3 | PO4 | 12 | 1218 | 12 | 1218 | 12 | 1218 | |
| Indoxacarb | 50 | | | 200:1 | | | | | | 25.5 |
| Indoxacarb | 50 | | | | | 200:1 | | | | 7.0 |
| Indoxacarb | 50 | | | | | | | 200:1 | | 7.5 |
| Indoxacarb | 50 | | | | | | 200:1 | | | 7.0 |
| Indoxacarb | 50 | | | | | | | | 200:1 | 8.0 |
| Indoxacarb | 75 | | | | | | | | | 20.0 |
| Indoxacarb | 100 | | | | | | | | | 12.5 |

In a first group of tests, the results of which are shown in Table 7 (pages 22-24), romaine lettuce plants two to three inches in height were exposed to 10 milliliters of solution applied to each plant using a low volume trigger spray. With respect to containers 0-7, ten plants were employed per container, nine were treated and one was an internal control. In containers M-H, ten plants per container were used, five were treated and 5 were internal controls. Each container was infested with 30 lepidopteran larvae between the $5^{th}$ and $6^{th}$ instar development. Fifteen cabbage loopers (*Trichoplusia ni*) and 15 beet armyworms (*Spodoptera exigua*) were used to infest the romaine lettuce plants. Visual evaluations for the average percentage total surface area damage were taken 24 hours after infestation. Percentage damage was evaluated by 5% increments for total damage across all plant leaves.

As indicated in the first column of Table 7, in some tests, no insecticide was employed and there were two controls; a no water control and a no dye control. A wide variety of insecticides selected from the following group were tested: Chlorantranilopril, Acephate, Methoxyfenozide, Spinosad, Permethrin, and Indoxacarb. The product concentration is shown in PPM in column 2 Column 3 is divided into two subunits, the first being $CO_3$ and the second, $PO_4$. In all instances in columns 3, 4 and 5 and their sub-columns, the concentrations used were 200:1. The fourth column employed amine oxide, but no buffer. The fifth column shows the preferred buffered amine oxide system which employs both amine oxide and a buffer. Two sub-columns each are represented for $CO_3$ and $PO_4$. The final column is a reading of the Percent Lepidopteran Damage to the romaine lettuce plants after 24 hours.

A second series of tests involved romaine lettuce discs approximately ⅝ inch in diameter. (*L. sativa*). The results are reported in Table 8. They were dipped in the treatment solution one second per disc. This test involved the 5/5 configuration, i.e., 5 treated and 5 untreated. The infestation involved either lepidopteran larvae at the $3^{rd}$ to $4^{th}$ instar development per container: four cabbage loopers (*Trichoplusia ni*), and four beet armyworms (*Spodoptera exigua*) were employed. The test containers were placed in a dark humidity cabinet at 15° C. and 80% relative humidity. Visual evaluations of the average percent damage were taken at 24, 48 and 72 hours after the initiation of infestation. The results are provided in the last column of Table 8. Damage was evaluated in 5% increments based on total disc area.

In addition to testing the buffered amine system of the present invention with the two amine oxides identified as $CO_3$ and $PO_4$ and their use with 12 carbon length and a mixture of 12 and 18 designated 1218 for comparative data purposes various differences were created in the testing. Some of the tests were performed with (a) no insecticide along with (b) no amine oxide for $CO_3$ and $PO_4$ and (c) with no buffer, but with amine oxide. Also, tests were run using no insecticide and no water control with no foliar application being made. Tests with no insecticide and no dye control employed foliar application of water only. The tests were conducted with all of the testing on the buffer alone, the amine oxide alone and the buffered amine oxide system of the present invention in the concentration of 200:1.

The tests were monitored at 24 hours with the results presented in the last column of Table 7 in percentage values. The concentrations of each of the insecticides remained constant for the first nine tests were increased for the tenth test and were further increased for the eleventh test. The first group of tests involving no insecticides. The test with only insecticide produced a value of 41. When the no insecticide tests were performed with no amine oxide for $CO_3$ and $PO_4$, the values were respectively 32.5 and 42.5. With the amine oxide and no buffer, the tests results were 41.5 and 48. With the use of the buffered amine oxide of the present invention, buffer $CO_3$ produced damage of only 28.0 and 47.5, respectively for carbon lengths 12 and 1218. Buffer $PO_4$ produced values of 45.0 and 60.0.

The values for no water control and no dye control were respectively 55.0 and 45.5.

In the test involving the insecticide Chlorantranilopril, at 60 ppm, with no amine oxide, the values were respectively 13.5 and 9.0. With amine oxide but no buffer, the values were 9.0 and 5.5 respectively. In the preferred buffered amine oxide system of the present invention, the values for $CO_3$ were 2.5 and 2.5 for carbon lengths 12 and 1218. For $PO_4$, the values were 4.0 and 0, respectively for carbon lengths 12 and 1218.

When the insecticide was increased 50% to 90 ppm, the damage value was 8.2 and when it was increased to 120 ppm, the damage value was 8.5. These tests show that the preferred buffered amine oxide system produced superior results to even the greatly increased concentration of the insecticide showing the economic advantage of using less while achieving applicant's successful results.

With respect to Acephate, the damage where the buffered amine oxide system of the invention was employed, ranged from 1.0 to 11.5 which was dramatically superior to the other two categories, i.e., no amine oxide and no buffer. With the no amine oxide, the values were 31.0 and 20.0 and with the no buffer, the values were 28.0 and 36.0. Increasing the concentration of the Acephate to 105 ppm and 140 ppm still showed increased damage of 16.5 and 13.0, respectively, as compared with applicant's preferred buffered amine oxide system.

When the insecticide concentration of 105 ppm and 140 ppm was employed the results were respectively 16.5 and 13.0 which was not as good as the buffered amine oxide system of the present invention. It is noted that as to the Chlorantranilopril and Acephate, the buffered amine oxide system of the present invention was superior to even increased quantities of the insecticide. As a result, superior inhibition of damage was achieved while employing less of the insecticide.

The tests involving the Methoxyfenozide showed with the two preferred buffers, damages ranging from 4.5 to 9.0 as compared with the tests involving no amine oxide or no buffer in which damages ranged from 13.0 to 29.5. Increasing the insecticide concentration to 150 ppm and 200 ppm resulted in 43.0 and 23.5 damage values which was substantially higher than the preferred buffered amine oxide system which produced values very substantially lower.

With the Spinosad tests, the range of damage with the preferred buffers and 12 and 1218 carbon lengths ranged from 6.5 to 12.5 while the tests lacking either amine oxide or a buffer had a range of 17 to 24.5.

Even when the concentration of the Spinosad was increased respectively to 45 and 60, the damages where 17.0 and 19.0 which exceeded by substantial amount the damage employing the system of the present invention.

With Permethrin, the damage employing the buffered amine oxide system of the invention ranged from 21.0 to 28.0 while for the other two categories involving no amine oxide or no buffer, the damage ranged from 72.0 to 83.0 which was very substantially above the tests involving the system of the invention. When the Permethrin was increased from 10 parts per million to 15 ppm and 20 ppm, the results, respectively, were 78.0 and 90.0. This once again confirms the substantial advantage of reducing the amount of insecticide use while achieving superior results through use of the buffered amine oxide system.

With the tests involving Indoxacarb, the range of damage employing the system of the present invention was 7.0 to 8, while the other tests involving either no amine oxide or no buffer ranged from 25.5 to 47. Increasing the concentration of Indoxacarb to tests involving 75 ppm and 100 ppm produced results of 20.0 and 12.0 which, despite the increase in insecticide, were inferior to the results produced by the present invention.

It will be appreciated, therefore, that the extensive tests reported in Table 7 establish synergism between the components of the present invention which produces superior results while employing less insecticide.

TABLE 8

| Insecticide | Product Concentration PPM | No Amine Oxide CO3 | No Amine Oxide PO4 | No Buffer 12 | No Buffer 1218 | Buffered Amine Oxide System CO3 12 | Buffered Amine Oxide System CO3 1218 | Buffered Amine Oxide System PO4 12 | Buffered Amine Oxide System PO4 1218 | Percent Lepidopteran Damage to Romaine Lettuce[1,4] 24 hr | 48 hr | 72 hr |
|---|---|---|---|---|---|---|---|---|---|---|---|---|
| No insecticide | 0 | | | | | | | | | 70.0 | 100.0 | 100.0 |
| No insecticide | 0 | 200:1 | | | | | | | | 80.0 | 99.0 | 100.0 |
| No Insecticide | 0 | | 200:1 | | | | | | | 61.5 | 100.0 | 100.0 |
| No insecticide | 0 | | | 200:1 | | | | | | 55.0 | 93.0 | 100.0 |
| No Insecticide | 0 | | | | 200:1 | | | | | 54.0 | 90.5 | 100.0 |
| No Insecticide | 0 | | | | | 200:1 | | | | 40.5 | 81.5 | 100.0 |
| No Insecticide | 0 | | | | | | 200:1 | | | 34.0 | 78.0 | 100.0 |
| No Insecticide | 0 | | | | | | | 200:1 | | 32.0 | 66.0 | 100.0 |
| No Insecticide | 0 | | | | | | | | 200:1 | 21.0 | 64.5 | 100.0 |
| No Insecticide (No water Control) | 0 | | | | | | | | | 60.0 | 90.0 | 100.0 |
| No Insecticide (No Dye Control) | 0 | | | | | | | | | 45.0 | 100.0 | 100.0 |
| Chlorantranilopril | 60 | | | | | | | | | 4.5 | 9.0 | 9.0 |
| Chlorantranilopril | 60 | 200:1 | | | | | | | | 13.0 | 17.5 | 19.5 |
| Chlorantranilopril | 60 | | 200:1 | | | | | | | 14.0 | 22.5 | 24.5 |
| Chlorantranilopril | 80 | | 200:1 | | | | | | | 4.5 | 8.0 | 8.5 |
| Chlorantranilopril | 60 | | | | 200:1 | | | | | 10.5 | 17.5 | 18.5 |
| Chlorantranilopril | 60 | | | | | 200:1 | | | | 3.0 | 5.0 | 5.0 |
| Chlorantranilopril | 60 | | | | | | 200:1 | | | 4.5 | 12.5 | 13.0 |
| Chlorantranilopril | 60 | | | | | | | 200:1 | | 1.0 | 2.0 | 2.0 |
| Chlorantranilopril | 60 | | | | | | | | 200:1 | 6.5 | 12.5 | 12.5 |
| Chlorantranilopril | 90 | | | | | | | | | 7.5 | 14.0 | 15.0 |
| Chlorantranilopril | 120 | | | | | | | | | 9.5 | 17.5 | 17.5 |
| Acephate | 70 | | | | | | | | | 27.5 | 47.5 | 79.5 |
| Acephate | 70 | 200:1 | | | | | | | | 50.0 | 57.5 | 61.0 |
| Acephate | 70 | | 200:1 | | | | | | | 38.5 | 53.0 | 68.5 |
| Acephate | 70 | | | 200:1 | | | | | | 27.0 | 49.5 | 59.5 |
| Acephate | 70 | | | | 200:1 | | | | | 22.0 | 52.5 | 67.0 |
| Acephate | 70 | | | | | 200:1 | | | | 34.0 | 63.5 | 66.0 |
| Acephate | 70 | | | | | | 200:1 | | | 43.5 | 55.5 | 72.0 |
| Acephate | 70 | | | | | | | 200:1 | | 29.5 | 50.5 | 63.5 |
| Acephate | 70 | | | | | | | | 200:1 | 18.0 | 32.5 | 51.0 |
| Acephate | 105 | | | | | | | | | 27.0 | 44.5 | 47.0 |
| Acephate | 140 | | | | | | | | | 29.0 | 35.5 | 42.0 |
| Methoxyfenozide | 100 | | | | | | | | | 84.0 | 94.0 | 96.0 |
| Methoxyfenozide | 100 | 200:1 | | | | | | | | 96.0 | 99.5 | 100.0 |
| Methoxyfenozide | 100 | | 200:1 | | | | | | | 100.0 | 100.0 | 100.0 |
| Methoxyfenozide | 100 | | | 200:1 | | | | | | 79.5 | 82.5 | 87.0 |

TABLE 8-continued

| Insecticide | Product Concentration PPM | No Amine Oxide CO3 | No Amine Oxide PO4 | No Buffer | Buffered Amine Oxide System CO3 12 | CO3 1218 | PO4 12 | PO4 1218 | Romaine Lettuce 24 hr | 48 hr | 72 hr |
|---|---|---|---|---|---|---|---|---|---|---|---|
| Methoxyfenozide | 100 | | | 200:1 | | | | | 72.0 | 80.5 | 87.5 |
| Methoxyfenozide | 100 | | | | 200:1 | | | | 42.5 | 51.5 | 57.0 |
| Methoxyfenozide | 100 | | | | | 200:1 | | | 54.5 | 67.5 | 73.0 |
| Methoxyfenozide | 100 | | | | | | 200:1 | | 43.0 | 67.0 | 73.5 |
| Methoxyfenozide | 100 | | | | | | | 200:1 | 85.0 | 87.0 | 88.0 |
| Methoxyfenozide | 150 | | | | | | | | 100.0 | 100.0 | 100.0 |
| Methoxyfenozide | 200 | | | | | | | | 100.0 | 100.0 | 100.0 |
| Spinosad | 30 | | | | | | | | 19.0 | 26.5 | 59.0 |
| Spinosad | 30 | 200:1 | | | | | | | 25.5 | 28.0 | 29.0 |
| Spinosad | 30 | | 200:1 | | | | | | 20.0 | 28.5 | 33.0 |
| Spinosad | 30 | | | 200:1 | | | | | 30.5 | 35.5 | 36.0 |
| Spinosad | 30 | | | | 200:1 | | | | 15.0 | 21.0 | 28.0 |
| Spinosad | 30 | | | | | 200:1 | | | 14.0 | 38.0 | 49.5 |
| Spinosad | 30 | | | | | | 200:1 | | 6.5 | 18.5 | 24.0 |
| Spinosad | 30 | | | | | | 200:1 | | 10.5 | 29.5 | 35.5 |
| Spinosad | 30 | | | | | | | 200:1 | 13.0 | 22.0 | 29.5 |
| Spinosad | 45 | | | | | | | | 12.0 | 23.5 | 36.0 |
| Spinosad | 60 | | | | | | | | 24.5 | 34.5 | 36.5 |
| Permethrin | 10 | | | | | | | | 85.5 | 100.0 | 100.0 |
| Permethrin | 10 | 200:1 | | | | | | | 53.5 | 97.5 | 100.0 |
| Permethrin | 10 | | 200:1 | | | | | | 28.5 | 79.0 | 100.0 |
| Permethrin | 10 | | | 200:1 | | | | | 17.0 | 60.0 | 89.0 |
| Permethrin | 10 | | | | 200:1 | | | | 24.0 | 95.0 | 100.0 |
| Permethrin | 10 | | | | | 200:1 | | | 23.5 | 67.0 | 91.0 |
| Permethrin | 10 | | | | | | 200:1 | | 3.0 | 10.5 | 21.0 |
| Permethrin | 10 | | | | | | 200:1 | | 2.0 | 4.5 | 5.0 |
| Permethrin | 10 | | | | | | | 200:1 | 1.5 | 3.0 | 3.0 |
| Permethrin | 15 | | | | | | | | 0.0 | 0.5 | 0.5 |
| Permethrin | 20 | | | | | | | | 1.5 | 4.0 | 4.5 |
| Indoxacarb | 50 | | | | | | | | 19.5 | 68.5 | 88.0 |
| Indoxacarb | 50 | 200:1 | | | | | | | 21.5 | 29.0 | 37.5 |
| Indoxacarb | 50 | | 200:1 | | | | | | 22.5 | 25.0 | 32.5 |
| Indoxacarb | 50 | | | 200:1 | | | | | 45.5 | 55.0 | 61.5 |
| Indoxacarb | 50 | | | | 200:1 | | | | 44.5 | 68.0 | 71.0 |
| Indoxacarb | 50 | | | | | 200:1 | | | 33.5 | 46.5 | 57.5 |
| Indoxacarb | 50 | | | | | | 200:1 | | 61.0 | 63.5 | 71.0 |
| Indoxacarb | 50 | | | | | 200:1 | | | 26.5 | 50.5 | 57.0 |
| Indoxacarb | 50 | | | | | | | 200:1 | 19.0 | 34.5 | 34.5 |
| Indoxacarb | 75 | | | | | | | | 32.0 | 38.0 | 72.0 |
| Indoxacarb | 100 | | | | | | | | 25.0 | 35.5 | 39.5 |

In the tests reported in Table 8 pages 29-32), romaine lettuce leaf discs ⅝" in diameter (*L. sativa*) were dipped in the treatment solution for about one second per disc. Infestation was provided by eight lepidopteran larvae at the $3^{rd}$ to $4^{th}$ instar development per container. Four cabbage loopers (*Trichoplusia ni*) and four beet armyworms (*Spodoptera exigua*) were employed in infestation. The containers were placed in a dark humidity cabinet at 15° C. and 80% relative humidity. Visual observations of the average percent damage was taken at 24, 48 and 72 hours after infestation. Damage evaluation was by 5% increments over the total disc area.

In the tests results provided in Table 8, the identity and concentrations of the insecticide was identical to the tests results reported in Table 7. The concentration of 200:1 was employed for the no amino oxide, no buffer and buffered amine oxide system. This series of tests, however, reported how the percent damage changed with time at the respective 24, 48 and 72 hour intervals.

With respect to the tests when no insecticide or no amine oxide or no buffer was employed, while the changes between 24 hour and 48 hour measurements varied, at 72 hours, there was 100 percentage damage. The same is true with respect to the no water control and no dye control.

Continuing with the Table 8 analysis, the Chlorantranilopril performance with the $CO_3$ and $PO_4$ formulations and 12 carbon length and 1218 carbon length had a range of 2 to 13 after 72 hours. When the concentration of Chlorantranilopril was increased to 90 and 120, respectively, the results after 72 hours were 15.0 and 17.5. Even at the enlarged concentration of Chlorantranilopril the buffered amine oxides in both the 12 and 1218 lengths produced superior performance to the use of the pesticide alone. With the increased concentration to 90 ppm and 120 ppm, Chlorantranilopril showed damage of 15.0 and 17.50 percent which confirms the superiority of applicant's in terms of achieving better results using less of the insecticide.

With Acephate, the buffered amine oxide system of the present invention after 72 hours the Acephate without using the buffered amine oxide experienced damage in the range of 59.5 through 79.5. This is to be contrasted with the buffered amine oxide tests at length 12 and 1218 of applicant's two buffered amine oxides which had damage in range of 51 through 72.

With the Methoxyfenozide, the ranges for the buffered amine oxide system after 72 hours were 57.0 to 88.0 which was a substantial improvement over the no amine oxide and no buffer. The Methoxyfenozide at concentrations of 100 without the amine oxide presented after 72 hours damage in the range of 87.5 to 100 and with the increased concentration of 150 to 200, 100 percent damage.

The Spinosad employed alone had a range of 28 to 59 damage. The range for the preferring amine oxide with Spinosad, at 72 hours was 29.5 to 49.5. The increased usage of Spinosad alone increased concentration of Spinosad alone produced results of 36.0 and 36.5.

With respect to Permethrin, applicant's buffered amine oxide system after 72 hours showed damage in the range of 3.0 to 91.0 as compared with the damage figures of 89.0 through 100% for the no amine and no buffer test. The increased concentration to 15 ppm and 20 ppm resulted in damage respectively as 0.5 and 4.5 percent.

With the Indoxacarb tests at 72 hours, applications damage values employing the buffered amine oxide ranged from 34.5 to 57.5 and with the no amine oxide and no buffer results were in the range of 32.5 to 88. The increased concentrations of the insecticide to 75 ppm and 100 ppm produced 72.0 and 39.5, respectively, damage which, in general, were similar to applicant's system which employed substantially less insecticide.

As will be apparent from the foregoing, extensive testing with a large number of different fungicides and insecticides showed by the comparative data that the buffered amine oxide system achieved a synergistic effect and improved results in terms of resisting damage to living plants. The buffered amine oxide system additives of the present invention may be employed in many ways such as mixing as tank blends with insecticide or incorporation into insecticide formulations.

It will be appreciated, therefore, that both in connection with fungicide tests and insecticide tests, neither the insecticide nor fungicide employed alone achieved any meaningful reduction in staining fungi or gypsy moth caterpillar in the lower concentrations of the material. Similarly, the buffered amine oxide system, when used alone, produced no significant reduction in staining fungi or gypsy moth caterpillar damage. When, however, the fungicide was used at lower parts per million in combination with the buffered amine oxide systems, there was, due to synergism, a substantial reduction or elimination of staining fungi. Similarly, when the insecticide was used in lower concentrations in combination with buffered amine oxide systems, there was substantial reduction or elimination of gypsy moth caterpillar damage.

It will be appreciated that the extensive additional tests regarding a wide variety of fungicides measured against staining fungi covering a stem wound of red oak seedlings and the additional testing of a wide range of insecticides in both testing against living romaine lettuce plants and romaine lettuce leaf discs challenged with lepidopteran larvae; cabbage loopers and beet army worms provided clear evidence of the synergistic effect of the combination contained in applicant's buffered amine oxide system buffers as contrasted with either no fungicide or insecticide or omission of the amine oxide or omission of the buffer.

While particular embodiments of this invention have been described herein for purposes of illustration, it will be evident to those skilled in the art that numerous variations of the details of the present invention may be made without departing from the invention as defined in the appended claims.

What is claimed is:

1. A solution for resisting destruction of living plants comprising a buffered amine oxide admixed with a material selected from the group consisting of an insecticide and a fungicide, said solution being characterized by the property of synergistically effecting greater resistance to plant destruction than said buffered amine oxide and either said insecticide or said fungicide employed alone, said buffered amine oxide having a dual buffer, said buffered amine oxide having a pH of 6.5 to 10.5, said buffered amine oxide being present in a concentration of 200:1 to 400:1 on a total solution volume basis.

2. The solution of claim 1 including said solution having a fungicide present in an amount of 50 ppm on a total solution weight basis.

3. The solution of claim 1 including said solution having an insecticide present in an amount of 10 ppm on a total solution weight basis.

4. The solution of claim 1 including said solution having said insecticide present in an amount of 10 to 100 ppm.

5. The solution of claim 2 including said buffered amine oxide having a carbon length selected from the group consisting of (a) 12 carbon length amine oxide and (b) a mixture of 12 and 18 carbon length amine oxide.

6. The solution of claim 5 including said buffered amine oxide having a carbon length of a mixture of 12 and 18 carbon length amine oxides.

7. The solution of claim 6 including said 12 carbon length amine oxide on a weight basis being present in an amount of 1.3 to 2.0 times the amount of 18 carbon length amine oxide.

8. The solution of claim 6 including said 12 carbon length amine oxide on a weight basis being present in an amount of 1.5 to 1.8 times the amount of 18 carbon length amine oxide.

9. The solution of claim 1 including said buffered amine oxide having a pH of 7 to 9.

10. The solution of claim 1 including said buffered amine oxide being 12 carbon length amine oxide and said buffer system selected from the group consisting of (a) Potassium Phosphate Monobasic/Potassium Phosphate Dibasic and (b) Potassium Bicarbonate/Potassium Carbonate.

11. The solution of claim 1 including said buffered amine oxide having a mixture of 12 carbon length amine oxide and 18 carbon length amine oxide, and said buffer selected from the group consisting of (a) Potassium Phosphate Monobasic/Potassium Phosphate Dibasic and (b) Potassium Bicarbonate/Potassium Carbonate.

12. The solution of claim 1 including said buffered amine oxide is Potassium Phosphate Monobasic/Potassium Phosphate Dibasic.

13. The solution of claim 1 including said buffered amine oxide is Potassium Bicarbonate/Potassium Carbonate.

14. A method for resisting destruction of living plants comprising providing a solution having a buffered amine oxide admixed with a material selected from the group consisting of an insecticide and a fungicide, and applying said solution to effect synergistic protection of said living plants against a pest selected from the group consisting of insects and fungi through said application of said solution synergistically effecting greater resistance to said plant deterioration than said buffered amine oxide and either said insecticide or said fungicide employed alone would achieve, employing a dual buffer in said buffered amine oxide, said buffered amine oxide having a pH of 6.5 to 10.5.

15. The method of claim 14 including said solution with said buffered amine oxide being present in an amount of 400:1 to 200:1 on a volume to volume basis based on total solution.

16. The method of claim 14 including said solution having a fungicide present in an amount of 50 ppm on a total solution weight basis.

17. The method of claim 14 including said solution having an insecticide present in an amount of 10 ppm on a total solution weight basis.

18. The method of claim 14 including said solution having insecticide in an amount of 10 to 100 ppm on a solution total weight basis.

19. The method of claim 14 including said buffered amine oxide having a carbon length selected from the group consisting of (a) 12 carbon length amine oxide and (b) a mixture of 12 and 18 carbon length amine oxides.

20. The method of claim 19 including said 12 carbon length amine oxide on a weight basis being present in an amount of 1.3 to 2.0 times the amount of 18 carbon length amine oxide.

21. The method of claim 19 including said 12 carbon length amine oxide on a weight basis being present in an amount of 1.5 to 1.8 times the amount of 18 carbon length amine oxide.

22. The method of claim 14 including said solution containing a buffered amine oxide having a pH of 6.5 to 10.5.

23. The method of claim 22 including said solution containing a buffered amine oxide having a pH of 7 to 9.

24. The method of claim 14 including said buffered amine oxide being 12 carbon length amine oxide, and a buffer amine oxide selected from the group consisting of (a) Potassium Phosphate Monobasic/Potassium Phosphate Dibasic and (b) Potassium Bicarbonate/Potassium Carbonate.

25. The method of claim 14 including said buffered amine oxide is Potassium Phosphate Monobasic/Potassium Phosphate Dibasic.

26. The method of claim 14 including said buffered amine oxide is Potassium Bicarbonate/Potassium Carbonate.

27. The method of claim 14 including said buffered amine oxide having a mixture of 12 carbon length amine oxide and 18 carbon length amine oxide and said buffers selected from the group consisting of (a) Potassium Phosphate Monobasic/Potassium Phosphate Dibasic and (b) Potassium Bicarbonate/Potassium Carbonate, and said buffered amine oxide having a concentration of 200:1 to 400:1 on a volume to volume basis.

28. A solution for resisting destruction of living plants comprising a dual buffered amine oxide admixed with an insecticide, and said solution being characterized by the property of synergistically effecting greater resistance to plant destruction than said buffered amine oxide and said insecticide employed alone, said buffered amine oxide having a pH of 6.5 to 10.5.

29. The solution of claim 28 including said insecticide being an insecticide selected from the group consisting of Chlorantranilopril, Acephate, Methoxyfenozide, Spinosad, Permethrin and Indoxacarb.

30. The solution of claim 29 including said buffered amine oxide having a carbon length selected from the group consisting of (a) 12 carbon length amine oxide and (b) a mixture of 12 and 18 carbon length amine oxide.

31. The solution of claim 29 including said buffered amine oxide being 12 carbon length amine oxide, and said buffer system selected from the group consisting of (a) Potassium Phosphate Monobasic/Potassium Phosphate Dibasic and (b) Potassium Bicarbonate/Potassium Carbonate.

32. The solution of claim 29 including said buffered amine oxide having a mixture of 12 carbon length amine oxide, and said buffer 18 carbon length amine oxide and said buffer selected from the group consisting of (a) Potassium Phosphate Monobasic/Potassium Phosphate Dibasic and (b) Potassium Bicarbonate/Potassium Carbonate.

33. The solution of claim 29 including said buffered amine oxide is Potassium Phosphate Monobasic/Potassium Phosphate Dibasic.

34. The solution of claim 29 including said buffered amine oxide is Potassium Bicarbonate/Potassium Carbonate.

35. A method of resisting destruction of living plants comprising providing a solution having a dual buffered amine oxide admixed with an insecticide, and applying said solution to said living plant to effect synergistic protection of said living plants against insects, said buffered amine oxide having a pH of 6.5 to 10.5.

36. The method of claim 35 including said insecticides being an insecticide selected from the group consisting of Chlorantranilopril, Acephate, Methoxyfenozide, Spinosad, Permethrin and Indoxacarb.

37. The method of claim 36 including said buffered amine oxide having a carbon length selected from the group consisting of (a) 12 carbon length amine oxide and (b) a mixture of 12 and 18 carbon length amine oxide.

38. The method of claim 36 including said buffered amine oxide being 12 carbon length amine oxide, and said buffer system selected from the group consisting of (a) Potassium Phosphate Monobasic/Potassium Phosphate Dibasic and (b) Potassium Bicarbonate/Potassium Carbonate.

39. The method of claim 36 including said buffered amine oxide having a mixture of 12 carbon length amine oxide, said buffer 18 carbon length amine oxide, and said buffer selected from the group consisting of (a) Potassium Phosphate Monobasic/Potassium Phosphate Dibasic and (b) Potassium Bicarbonate/Potassium Carbonate.

40. The method of claim 36 including
said buffered amine oxide is Potassium Phosphate Monobasic/Potassium Phosphate Dibasic.

41. The method of claim 36 including
said buffered amine oxide is Potassium Bicarbonate/Potassium Carbonate.

42. A solution for resisting destruction of living plants comprising
a dual buffered amine oxide admixed with a fungicide, and
said solution being characterized by the property of synergistically effecting greater resistance to plant destruction than said buffered amine oxide and said fungicide employed alone,
said buffered amine oxide having a pH of 6.5 to 10.5.

43. The solution of claim 42 including
said fungicides being a fungicide selected from the group consisting of Thiabendazole, Fludioxonil, Azoxystrobin, Chlorothalonil, Propiconazole, Mancozeb, Vinclozolin and Mefenoxam.

44. The solution of claim 43 including
said buffered amine oxide having a carbon length selected from the group consisting of (a) 12 carbon length amine oxide and (b) a mixture of 12 and 18 carbon length amine oxide.

45. The solution of claim 43 including
said buffered amine oxide being 12 carbon length amine oxide, and
said buffer system selected from the group consisting of (a) Potassium Phosphate Monobasic/Potassium Phosphate Dibasic and (b) Potassium Bicarbonate/Potassium Carbonate.

46. The solution of claim 43 including
said buffered amine oxide having a mixture of 12 carbon length amine oxide and 18 carbon length amine oxide, and
said buffer selected from the group consisting of (a) Potassium Phosphate Monobasic/Potassium Phosphate Dibasic and (b) Potassium Bicarbonate/Potassium Carbonate.

47. The solution of claim 43 including
said buffered amine oxide is Potassium Phosphate Monobasic/Potassium Phosphate Dibasic.

48. The solution of claim 43 including
said buffered amine oxide is Potassium Bicarbonate/Potassium Carbonate.

49. A method of resisting destruction of living plants comprising
providing a solution having a dual buffered amine oxide admixed with a fungicide, and
applying said solution to said living plant to effect synergistic protection of said living plants against fungi,
said buffered amine oxide having a pH of 6.5 to 10.5.

50. The method of claim 49 including
said fungicides being a fungicide selected from the group consisting of Chlorantranilopril, Acephate, Methoxyfenozide, Spinosad, Permethrin and Indoxacarb.

51. The method of claim 50 including
said buffered amine oxide having a carbon length selected from the group consisting of (a) 12 carbon length amine oxide and (b) a mixture of 12 and 18 carbon length amine oxide.

52. The method of claim 50 including
said buffered amine oxide being 12 carbon length amine oxide, and
said buffer system selected from the group consisting of (a) Potassium Phosphate Monobasic/Potassium Phosphate Dibasic and (b) Potassium Bicarbonate/Potassium Carbonate.

53. The method of claim 50 including
said buffered amine oxide having a mixture of 12 carbon length amine oxide and 18 carbon length amine oxide, and
said buffer selected from the group consisting of (a) Potassium Phosphate Monobasic/Potassium Phosphate Dibasic and (b) Potassium Bicarbonate/Potassium Carbonate.

54. The method of claim 50 including
said buffered amine oxide is Potassium Phosphate Monobasic/Potassium Phosphate Dibasic.

55. The method of claim 50 including
said buffered amine oxide is Potassium Bicarbonate/Potassium Carbonate.

* * * * *

UNITED STATES PATENT AND TRADEMARK OFFICE
CERTIFICATE OF CORRECTION

PATENT NO. : 11,779,016 B2
APPLICATION NO. : 17/311204
DATED : October 10, 2023
INVENTOR(S) : Ronald W. Clawson, Jr. et al.

It is certified that error appears in the above-identified patent and that said Letters Patent is hereby corrected as shown below:

On the Title Page

The PCT Application No. at item [86] listed as:
"PCT/UD2019/037851"
Should read:
--PCT/US2019/037851--.

Signed and Sealed this
Twelfth Day of December, 2023

Katherine Kelly Vidal
*Director of the United States Patent and Trademark Office*